United States Patent [19]

Gebhard

[11] 4,364,209
[45] Dec. 21, 1982

[54] WINDOW GLAZING SYSTEM

[76] Inventor: Paul C. Gebhard, 21 S. Brookside Dr., White Meadow Lake, Rockaway, N.J. 07866

[21] Appl. No.: 179,770

[22] Filed: Aug. 20, 1980

[51] Int. Cl.³ .............................................. E06B 3/00
[52] U.S. Cl. ........................................ 52/208; 52/772; 52/400
[58] Field of Search .................. 52/765, 773–775, 52/476, 397–403, 98, 100, 202, 656, 772, 208; 49/463

[56] References Cited

U.S. PATENT DOCUMENTS

| | | | |
|---|---|---|---|
| 589,600 | 9/1897 | Hendricks | 52/765 |
| 2,003,982 | 6/1935 | Swanson | 52/202 |
| 2,205,538 | 6/1940 | Owen | 52/773 |
| 2,250,624 | 7/1941 | Bugatti | 52/400 |
| 2,505,553 | 4/1950 | Krantz | 52/773 |
| 3,152,369 | 10/1964 | Gottesleben | 52/476 |
| 3,241,281 | 3/1966 | Hall | 52/476 |
| 3,242,627 | 3/1966 | Fountain | 52/288 |
| 3,344,573 | 10/1967 | Martin et al. | 52/403 |
| 3,487,601 | 1/1970 | James | 52/400 |
| 3,571,994 | 3/1971 | Brown et al. | 52/400 |
| 3,785,106 | 1/1974 | Fink | 52/476 |
| 3,824,753 | 7/1974 | Anderson | 52/476 |
| 4,006,569 | 2/1977 | Kain | 52/400 |
| 4,065,900 | 1/1978 | Eggert | 52/476 |
| 4,081,934 | 4/1978 | Franz | 52/790 |
| 4,118,911 | 10/1978 | Lewchuk | 52/203 |
| 4,149,348 | 4/1979 | Pyzewski | 52/790 |
| 4,292,771 | 10/1981 | Ellis | 52/98 |

Primary Examiner—James L. Ridgill, Jr.
Attorney, Agent, or Firm—Mandeville and Schweitzer

[57] ABSTRACT

A window frame and a glazing strip or rim for a window panel in which the frame defining a window has a J-shaped channel with its open side facing toward the opening in the frame. The panel is surrounded on at least three sides of a rectangular panel by the glazing strip or rim which has a leg integral therewith and which is received in the frame channel. Such leg is flexible and resilient and can be bent to permit the free end thereof to ride over the shorter wall of the channel and snap into the channel. Preferably, the portion of the rim from which the leg extends is U-shaped in cross-section and embraces the outer edge portions of the panel. A resilient gasket is between the rim and the frame. If the rim is of metal, the wall of the rim remote from the frame has a line of weakening for tearing purposes. A resilient strip may be inserted between the leg and a portion of the rim. Also, a tool for inserting the panel in the frame and a double-glazed window.

15 Claims, 14 Drawing Figures

WINDOW GLAZING SYSTEM

This invention relates to window glazing and particularly, to glazing strips which hold a panel or pane firmly in place in a window frame, which snap into place and which permit the pane to be removed easily for repair or replacement.

The invention is particularly useful for the windows of vehicles but may be used for other purposes. Current and proposed Federal regulations require that vehicle window panes pass certain impact tests which involve striking the pane with a relatively heavy object moving at a relatively high velocity. The glazing strips must stay in place, and hold the pane in place, even though the strips are subjected to relatively high forces tending to dislodge them. Such requirements make it difficult to provide strips which snap into place, and thereby make it easy to install a pane, and which are also simple to remove when it is necessary to repair or replace a pane.

A large amount of effort has been devoted to the design of means for retaining a pane in place in a frame and for providing an effective seal against fluid leakage between the pane and the frame. Generally speaking, a resilient gasket material is used between the pane and the frame for leakage prevention, and either the gasket material is formed to retain the pane in place or metal or plastic parts are used to hold the pane, or a rim therearound, in place.

U.S. Pat. No. 2,250,624 discloses a gasket surrounding the edges of a pane for sealing purposes, a separate metal rim engaging the gasket and a plurality of spaced chips bearing against a lip formed in the window frame and either bearing against or secured to the rim. Such clips do not have the desired resistance to impact forces and should have covers not only for aesthetic reasons but also to prevent accidental or unauthorized dislodgement of such clips. In some cases, screws or rivets are needed to secure the clips to the rim which is undesirable. U.S. Pat. No. 3,242,627 discloses similarly unsatisfactory clips.

U.S. Pat. No. 3,344,573 discloses the use of elastomeric beads or a separate, flexible, metal strip engaging a gasket which surrounds the pane. Neither of such constructions has high impact resistance. U.S. Pat. Nos. 2,505,553 and 3,487,601 disclose similarly unsatisfactory metal strips directly engaging the pane, and U.S. Pat. No. 3,571,994 discloses complex rubber gaskets and retainers which also do not provide high impact resistance.

U.S. Pat. Nos. 3,785,106 and 4,006,569 disclose better impact resisting structures for retaining panes in a window frame, but such structures are expensive to construct and require partial or complete disassembly of the frame for removal of a pane and then, re-assembly thereof when the pane is replaced or re-installed. In addition, with such structures, field replacement of the pane, or other parts, is difficult because, without in-shop assembly equipment, accuracy of dimensions and angles is difficult to maintain.

One object of the invention is to provide means for retaining a panel or pane in a window frame, which means retains the panel in place when subjected to relatively high impact forces and which means permits the panel or pane to be simply and easily installed or replaced.

In the presently preferred embodiment of the invention, a metal frame, which defines the opening for receiving the panel or pane, has a J-shaped channel which has its open side facing toward the opening in the frame. The panel is surrounded by a glazing strip or rim, preferably of metal, which has integral therewith a leg, at at least three sides of the periphery of a rectangular panel, which is received in the channel. The leg at at least three sides of the panel is flexible and resilient and can be bent to permit the free end thereof to ride over the shorter wall of the frame channel and snap into the channel. Preferably, the portion of the rim from which the leg extends is U-shaped in cross-section and embraces the outer edge portions of the panel. A resilient gasket is interposed between the rim and the long wall of the channel in the frame.

When the rim is made of metal, the wall of the U-shaped rim portion which is remote from the long wall of the frame channel and which is accessible without removing the panel is provided with a line of weakening so that such wall may be torn away when it is desired to remove the panel. When the rim is made of a material which can be relatively easily cut, such line of weakening is not required since a cutting instrument may be used to sever the leg from the remainder of the rim and thereby, permit removal of the panel.

Other objects and advantages of the present invention will be apparent from the following detailed description of the presently preferred embodiments thereof, which description should be considered in conjunction with the accompanying drawings in which.

The invention will be described in connection with a rectangular vehicle window, but the invention is, of course, applicable to windows or openings of other shapes and appurtenant to other structures. Normally, the panel in the window opening will be transparent glass or a plastic material, but the panel may be of other materials, transparent or opaque.

Figure 1:
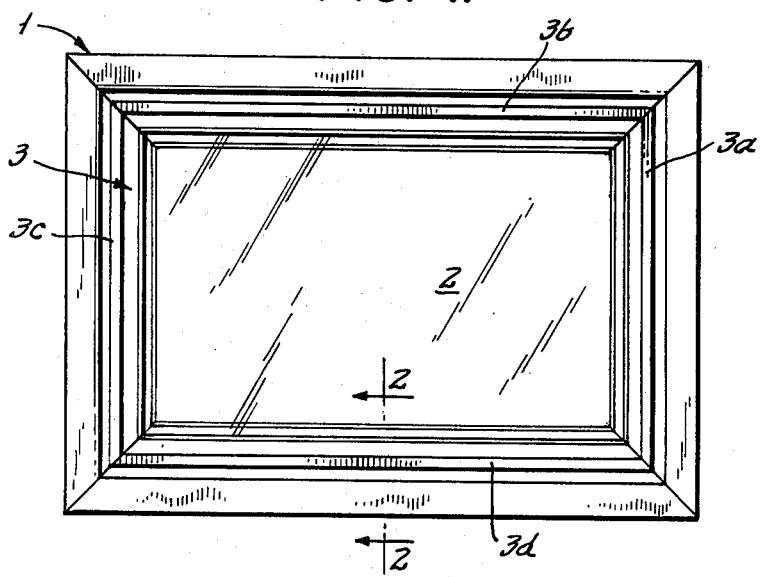
FIG. 1 is an elevation view of a window frame with a transparent panel retained therein by the glazing strips of the invention.

FIG. 1 illustrates a rectangular window frame 1 viewed from the outside which may be affixed to a vehicle or other structure (not shown). A transparent panel or pane 2 is retained within the frame 1 by a rim 3 which extends around the panel 2. The rim has four sections 3a, 3b, 3c and 3d which meet at mitered joints at the corners although square cut joints could be used. Each of the four sides of the panel is rectilinear, and each rim section extends along one of the sides of the panel. Thus, taken together, the sections 3a–3d form a rim 3 which extends around the periphery of the panel 2.

Figure 2:
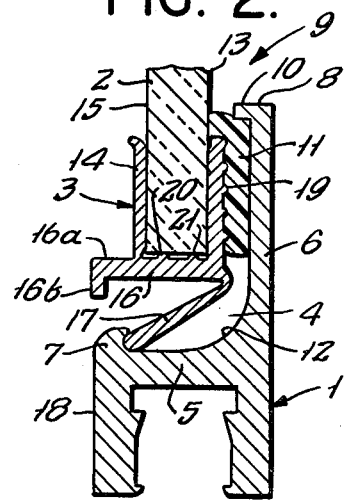
FIG. 2 is a partial cross-section taken along the line 2—2 indicated in FIG. 1.

The frame 1 may also be formed of multiple sections secured together, such as by welding, and the cross-section of the frame 1 may be substantially the same throughout its peripheral length. As shown in FIG. 2, the frame 1, in cross-section, has a J-shaped channel 4 with a bottom wall 5 and an outer or front wall 6 and an inner lip 7 extending in the same direction from the bottom wall 5. The wall 6 and lip 7 are spaced apart, and the end 8 of the wall 6 remote from the wall 5 defines the opening 9 in the frame 1. The front wall 6 is generally parallel to the plane of the opening 9 although it has a projection 10 which extends toward the panel 2 and partially covers the upper end of a resilient sealing means 11 made, for example, of rubber, and has an arcuate portion 12 interconnecting it and the bottom wall 5. The open side of the channel 4 faces toward the frame opening 9.

The end 8 is farther from the bottom wall 5 than the upper end of the lip 7, and a portion of the wall 6 extends over a peripheral portion of one major face 13 of the panel 2. The periphery of the panel 2 is larger than the periphery of the opening 9, as defined by the end 8 of the wall 6, but is of a size which will permit the panel 9 to be inserted into the frame 1, as described hereinafter, and hence, is of a size which will permit it to pass through the inner periphery of the lip 7 as defined by the upper end of the wall 7.

Figure 9:
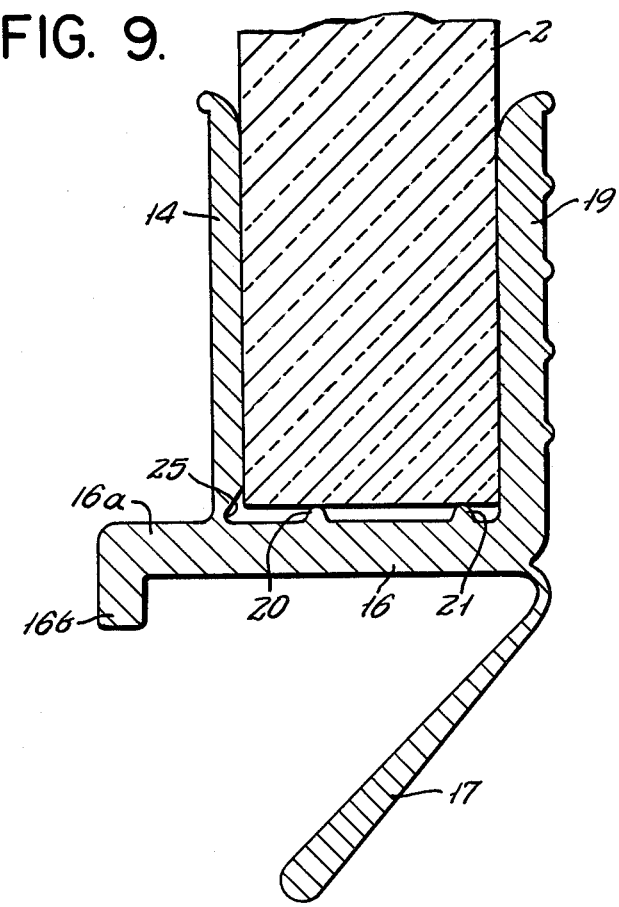
FIG. 9 is an enlarged cross-section of a portion of the embodiment shown in FIG. 2.

As shown in FIGS. 2 and 9, the rim 3, in cross-section, has a first panel-retaining flange portion 14 which extends over and engages a peripheral portion of the other major face 15 of the panel 2, a base portion 16 which extends over and engages the edge surfaces of the panel 2 and a leg 17 which is flexible and resilient by reason of its relatively thinner, hinge-like attachment to the front of the base portion 16. The leg 17 extends from the portion 16 in a direction opposite from the direction in which the flange 14 extends from the base 16 and preferably, extends at an angle of from about 30° to about 45° to the direction of forces tending to move the panel 2 away from the wall 6, such forces being directed perpendicular to the face 13 of the panel 2.

Preferably, the base 16 has an extension 16a and a lip 16b to improve the appearance of the installation by obscuring the leg 17 and to reduce access to the leg 17. The outer faces of the extension 16a and the lip 16b are substantially aligned with the outer face 18 of the frame 1. Lip 16b also serves as a retainer for a strip 24 described hereinafter and if used.

In the preferred embodiment, the rim 3 also has a second panel-retaining flange portion 19 which extends in the same direction from the base 16 as the flange 14 so as to form a channel in which the peripheral edge portion of the panel 2 is received. The second flange 19 aids in assembling the rim 3 with the panel 2 prior to installation of the panel 2 with the rim 3 thereon in the frame 1. The flange 19 also aids in preventing tilting of the rim under the action of the resilient leg 17.

The flange portions 14 and 19 closely embrace the panel 2, and preferably, the base portion 16 has ridges 20 and 21 at its surface facing the panel 2 to engage a cushioning or sealing material which may, if desired or necessary to protect the edges of the panel 2 or to provide further sealing, be inserted between the edge surfaces of the panel 2 and adjacent base portion 16. Also, the second flange 19 (which may be referred to as the front flange) preferably has ridges 22 which penetrate into the sealing means 11 which may be adhesively bonded to the wall 6. Rims 3 having different spacings between the panel-retaining flanges 14 and 19 are required for different panel thicknesses.

In cross-section, the rim 3 is monolithic. In other words, the flange portions 14 and 19, the base portion 16, and the leg 17 are all one piece, and preferably, the sections 3a–3d of the rim 3 are extrusions having the cross-section illustrated in FIG. 2. In the preferred embodiments of the invention, the sections are aluminum extrusions but other metals may be used and other methods may be employed to manufacture the sections.

The leg 17, which may be referred to as the locking leg, is shaped and made of such size and materials such that when the panel and rim assembly is in place in the frame 1, the sealing means 11 is slightly compressed by the front flange 19 and the panel 2, and the leg 17 not only presses against the inner side of the lip 7 but also presses downwardly against the wall 5. Preferably, the lip 7 has a recess 23 (see FIG. 3) which receives the correspondingly shaped end of the locking leg 17, such recess 23 aiding in preventing the leg 17 from riding up over the lip 7 when push-out forces are applied to the surface 13 of the panel 2. Of course, the sealing means 11 must be sufficiently compressible to permit the end of the leg 17 to enter the recess 23 when the panel 2 and the rim 3 are installed in the frame 1.

Figure 3:
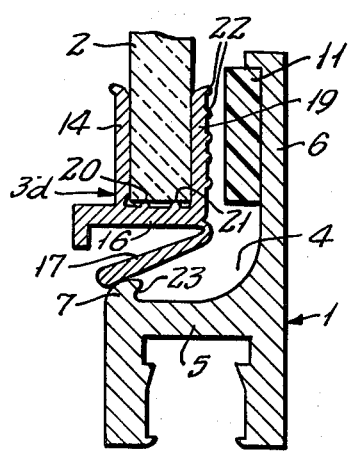
FIG. 3 is similar to FIG. 2 but illustrates the position of the parts as the panel is pushed into place.

FIG. 2 illustrates the relative positions of the parts when the panel 2 and the rim 3 are installed in the frame 1. FIG. 3 illustrates the relative positions of the parts after the rim 3 has been applied to the panel 2 and just prior to the time that the portion 19 engages the sealing means 11 and the leg 17 enters the channel 4 in the frame 1 as the panel-rim combination is being moved to the right, as viewed in FIG. 3, and toward the wall 6. At this point, the leg 17 rides on the upper edge of the lip 7 and has been moved toward the base portion 16 of the rim. Prior to this point, the spacing between the free end of the leg 17 and the base portion 16 was at least equal to the spacing therebetween shown in FIG. 2. As the panel-rim combination is moved further toward the wall 6, the sealing means 11 is engaged and compressed and the locking end of the leg 17 snaps into the recess 23.

When the panel-rim combination is installed as illustrated in FIG. 2, impact forces applied to the inside or back surface 15 of the panel 2 are resisted by the wall 6, and push-out forces applied to the front or outer surface 13 of the panel are resisted by the locking leg 17 bearing against the lip 7. It has been found from tests that the present and proposed Federal regulations relating to impact resistance of vehicle windows are met when the parts, other than the sealing means 11, are made of type 6063T6 aluminum and the parts have approximately the following dimensions:

| ITEM | THICKNESS - INCHES | LENGTH - INCHES |
| --- | --- | --- |
| Wall 6 | 0.109 | (below 10) 1.281 |
| Lip 7 | 0.181 | (at recess 23) 0.125 |
| Flange 14 | 0.047 | 0.658 |
| Base 16 | 0.078 | 0.406 |
| Flange 17 | (free end) 0.030 radius (bend end) 0.020 | 0.594 |
| Portion 19 | 0.062 | 0.658 |

The spacing between the wall 6 and lip 7 was 0.679 inches, the spacing between the flange portions 14 and 19 was 0.406 inches and the radius of the recess 23 was 0.030 inches.

Figure 4:
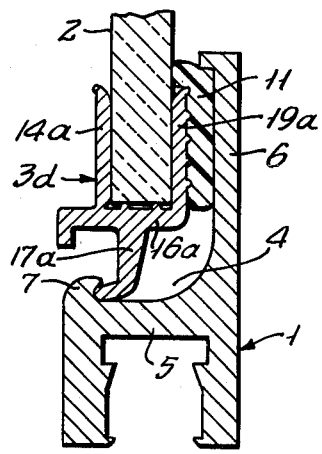
FIG. 4 is a cross-section of a modified form of glazing strip which may be used at one edge of the panel.
Figure 5:
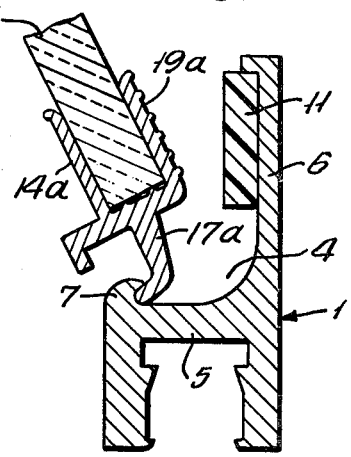
FIG. 5 is similar to FIG. 4 but illustrates the insertion of the strip of FIG. 4 in the frame channel.

Although each of the rim sections 3a-3d may be identical in structure, permitting the panel 2 with the rim 3 thereon to be pressed into place with its major surfaces parallel to their final positions shown in FIG. 2, one of the sections 3a-3d, and preferably, the bottom section 3d, may be different in structure. Thus, as shown in FIG. 4, the section 3d may be the same as the other sections except for the leg 17a which is rigid rather than flexible and resilient. The section 3d has first and third portions 14a and 19a extending from one side of a second portion 16a and a rigid leg 17a extending from the other side of the portion 16a. When the panel 2 with the rim 3 therearound is inserted into the frame 1, the panel 2 is tilted as illustrated in FIG. 5, and the leg 17a is first inserted into the channel 4 in the frame 1. Thereafter, the remainder of the panel-rim combination is pushed toward the frame 1 causing the legs 17 of the remaining sections 3a-3c to snap into the channel 4.

Figure 6:
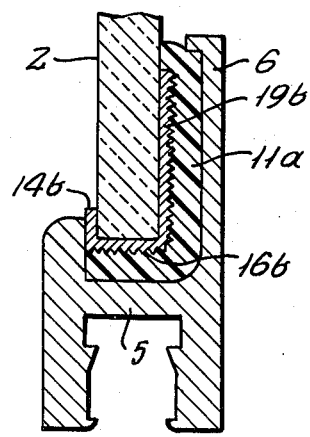
FIG. 6 is a cross-section of a modified form of glazing strip which may be used at one edge of a panel.

Alternatively, the rim section 3d may have the structure shown in FIG. 6. The rim section shown in FIG. 6 has a back flange 14b and a front flange 19b extending from a base portion 16b, but a leg 17 or 17a is omitted. The sealing means 11a is extended so that it is adjacent both the portion 19b and the portion 16b. The panel 2 with the rim 3 therearound is inserted into the frame 1 in the same manner described in connection with FIG. 5, namely, the rim section shown in FIG. 6 is inserted in the channel 4 with the panel 2 in a tilted position and then the remainder of the panel 2 and the sections 3a-3c are pushed into place.

Figure 7:
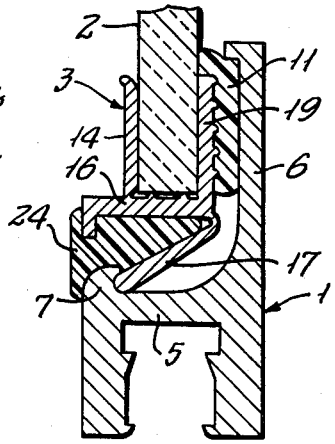
FIG. 7 is similar to FIG. 2 but illustrates the use of a spline or insert to increase the resistance of the panel to displacement by pressure forces.

If the panel 2 is relatively heavy and it is desirable to provide support therefor other than what is provided by the leg 17 and/or if it is desired to increase the resistance of the glazing rim 3 shown in FIGS. 2, 3 and 9 to displacement by push out forces applied to the surface 13 of the panel 2 and/or vibration of frame 1 caused by a vehicle in which it is installed, a resilient insert or strip 24 which is wedge-shaped in cross-section may be inserted between the leg 17 and the rim base portion 16 as illustrated in FIG. 7. Such insert fills the space between the leg 17 base portion 16 and is forced into the space between the leg 17 base portion 16 after the panel 2 and the rim 3 are in the positions shown in FIG. 2. The insert 24 may be made of rubber or a resilient plastic material, e.g. silicone rubber, and preferably, is partially compressed when it is in the position shown in FIG. 7. The insert 24 also improves the appearance of the installation, reduces access to the leg 17 and prevents the ingress of moisture and other foreign matter into the space between the leg 17 base portion 16 and aids in providing a seal between the rim 3 and the frame 1.

Figure 8:
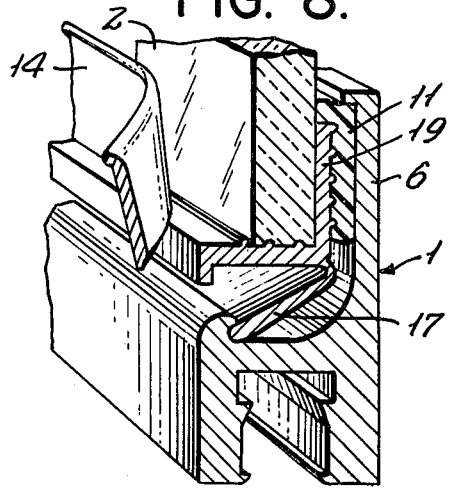
FIG. 8 is a perspective view of the portion of the glazing strip shown in FIG. 2 and illustrates tearing of the strip for the removal of the panel.

To permit easy removal of a panel 2 if, for example, it has been damaged, the rim 3 is provided with a line of weakening 25 when the rim 3 is made of metal. The line of weakening 25 is formed at the intersection of the back flange 14 and the second base 16 (see FIG. 9) and may be in the form of an undercut groove in the lower part of the flange 14. The depth of the groove is such that the flange 14 may be torn away from the base 16 as illustrated in FIG. 8, but it is not deep enough to permit the flange 14 to tear when the panel 2 is subjected to push out forces at the face 13. In the example set forth hereinbefore, the thickness of the portion 14 at the line of weakening was approximately 0.030 inches.

After the flange portion 14 is torn away along at least three sides of the panel 2, the panel 2 may be removed from the rim 3. Thereafter the remaining parts of the rim 3 may be pried out of the channel 4, and, of course, a new rim 3 is used with the replacement panel 2.

In the preferred embodiment of the invention, the rim 3 is made entirely of a metal, such as aluminum, because the panel 2 cannot be dislodged from the frame 1 under the impact test conditions described hereinbefore. However, in some cases, and particularly if it is not necessary to meet the requirements of the more severe impact tests, good resistance to impact forces can be provided by making the rim 3 of a plastic material, such as polyvinyl chloride, of a relatively high hardness. The rim 3 may also be combined with the sealing means if the portions of the rim 3 which provide the sealing means has a comparatively low hardness so that it is readily compressible.

Figure 10:
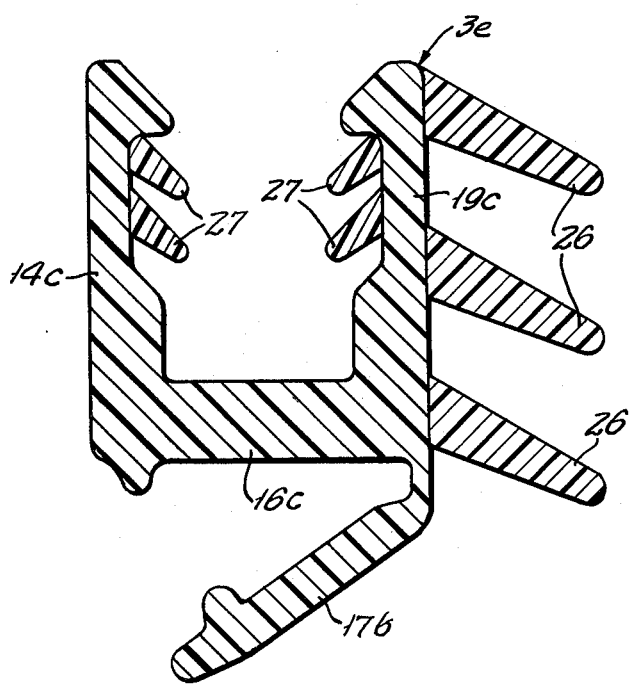
FIG. 10 is a cross-section of a modified form of a glazing strip.
Figure 11:
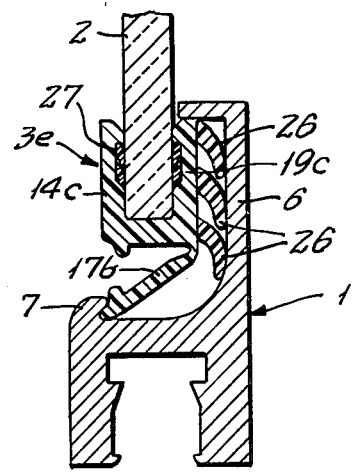
FIG. 11 is a cross-section of the glazing strip of FIG. 10 as used to retain a panel in the frame illustrated in FIG. 1.

FIG. 10 illustrates a rim or rim section 3e which may be used in place of the rim 3 or rim sections 3a-3d described hereinbefore, and FIG. 11 illustrates a panel 2 installed in the frame 1 with the rim 3e on the panel 2. The rim 3e has back and front flanges 14c and 19c extending from, and integral with, a base portion 16c and a flexible, resilient leg locking 17b extending from, and integral with, the portion 16c. The portions 14c, 16c and 19c and the leg 17b may be made of a relatively hard plastic or rubber material to provide good resistance to push out forces applied to the surface 13 of the panel 2. One suitable material is polyvinylchloride having a hardness of about 65±5 on the Shore A scale.

Those skilled in the art have developed techniques to extrude an element of the cross-section illustrated in FIG. 10 with portions thereof having different hardnesses. Accordingly, in the preferred embodiment of the rim made of a non-metallic material, the means for sealing the rim 3e to the wall 6 is made integral with the rim 3e and is made of substantially the same material as the rim 3e but has a lower hardness compared to the material of the portions 14c, 16c and 19c and the leg 17b. Thus, as shown in FIG. 10, the rim 3e is provided with a plurality of extensions 26 which replace the sealing means 11 and which provide a seal between the rim front flange 19c and the wall 6. If the rim 3e is made of polyvinyl chloride, the extensions may be made of polyvinyl chloride having a hardness of about 76±5 on the Shore D scale.

If it is desired to improve the seal between the panel 2 and the rim 3e, the rim 3e may also be provided with the extensions 27, of the same material and hardness as the extensions 26.

Figure 12:
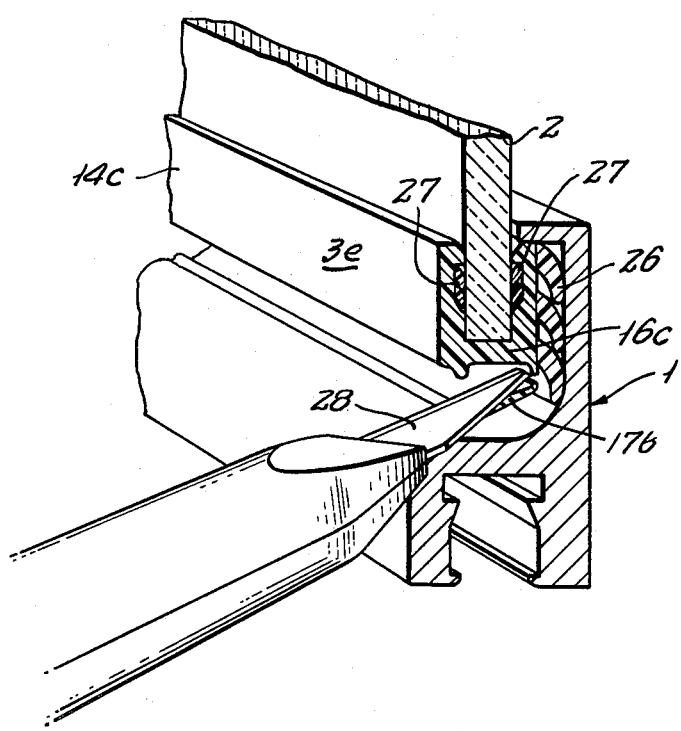
FIG. 12 is a perspective view illustrating the cutting of the glazing strip of FIGS. 10 and 11 to permit the removal of the panel.

When the rim is made of a material which can be readily cut, such as a plastic or rubber material, it is not necessary, but permissible, to include a line of weakening 25 at the juncture of the flange and base portions 14c and 16c to permit removal of a panel 2 from the frame 1. Instead, a sharp instrument 28 may be inserted beneath the base portion 16c, as illustrated in FIG. 12, and may be used to sever the locking leg 17b from the remainder of the rim 3e. After the leg 17b is severed from the rim at at least three sides of the panel 2, the panel 2 may be removed from the frame 1.

To further improve the resistance of the rim 3e to dislodgement from the frame 1, an insert or strip, like the strip 24 (see FIG. 7) may be inserted between the leg 17b and the base portion 16c.

Figure 13:
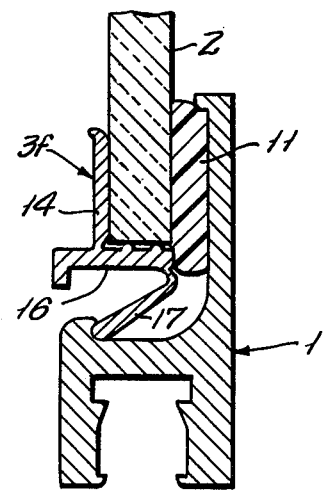
FIG. 13 is a cross-section of a modified form of a glazing strip.

In the preferred embodiment of the invention, the rim has three portions, i.e. 14, 16 and 19; 14a, 16a and 19a; 14b, 16b and 19b; or 14c, 16c and 19c for the reasons set forth hereinbefore. However, in some cases, the front flange portions 19, 19a, 19b or 19c may be omitted if the disadvantages of omitting such portions can be tolerated. FIG. 13 illustrates a rim or rim section 3f which is identical to the rim 3 shown in FIG. 2 except for the omission flange portion 19.

Figure 14:
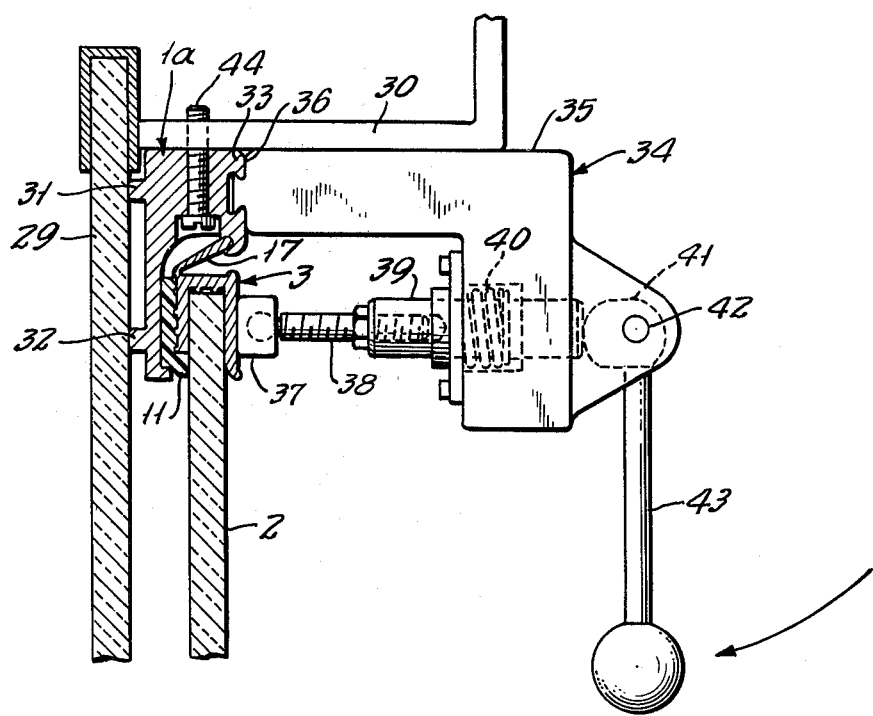
FIG. 14 is a cross-section of a double-glazed window installation illustrating the use of the frame and panel assembly to form the second panel of the installation.

The invention may be used for both single and double-glazed windows. FIG. 14 illustrates a panel 29 secured to a support 30 which extends around and defines the periphery of the opening which is covered by the panel 29. The panel 29 is secured to the support 30 by means (not shown) which may be of any known type. A modified frame 1a which has a pair of spacing ribs 31 and 32 and a dove-tail groove 33 is secured to the support 30, such as by screws 44, and also extends around the window opening. A sealing gasket (not shown) may be interposed between the frame 1a and the support 30, and if desired, dessicants or other materials may be included between the panels 2 and 29 as described in U.S. Pat. Nos. 4,081,934; 4,149,348; and 4,118,911.

After the frame 1a is secured to the support 30, the panel 2-rim 3 combination may be inserted into the frame 1a as previously described. Insertion of the panel 2-rim 3 combination into the frame 1a may be aided by the use of a tool 34 similar to, but different from, the tool described in U.S. Pat. No. 4,118,911.

The tool 34 comprises an L-shaped body 35 having a dove-tail extension 36 which fits into the groove 33, the wall of the groove 33 being cut back at at least one end of a section of the frame 1a to permit insertion of the extension 36 into the groove 33. The tool also comprises a head 37 pivotably mounted on the end of an adjusting screw 38 threaded into a rod 39 slidably mounted on the body 35 and urged to the right, as viewed in FIG. 14, by a spring 40. An end of the rod 39 bears against a cam 41 pivotably mounted on the body 35 by a shaft 42, and a handle 43 extends from the cam 41. Manual operation of the handle 43 permits the head 37 to move away from the rim 3 or causes the head 37 to push the rim 3 toward the frame 1a. Thus, after the panel 2-rim 3 combination has been positioned adjacent the frame 1a, as illustrated in FIG. 3, the combination may be pressed by the tool 34 into the position shown in FIG. 14.

Although preferred embodiments of the present invention have been described and illustrated, it will be apparent to those skilled in the art that various modifications may be made without departing from the principles of the invention.

What is claimed is:

1. An impact resistant window structure or the like, having a quick replaceable glazing assembly which comprises
  (a) a structural frame forming a primary opening,
  (b) said structural frame comprising a channel-forming member having a base portion, a front flange extending inward of said opening from said base portion, and a lip-forming flange spaced from said front flange,
  (c) said lip-forming flanges, in the structural frame forming an access opening larger than said primary opening,
  (d) said glazing assembly including a glazing panel of a size an shape corresponding generally to said openings,
  (e) said glazing assembly further including a glazing frame engaging and extending about the periphery of said glazing panel,
  (f) said glazing frame being formed of glazing strips of unitary, monolithic, extruded construction and including at least a base portion, a back flange extending from said base portion and overlying the back peripheral surface areas of said panel, and integral snap-in locking strips,
  (g) the base portions of certain of said glazing strips having front portions and said locking strips being integrally joined with said front portions and running lengthwise of said strips,
  (h) said locking strips extending at an angle rearward and outward with respect to said opening,
  (i) the glazing assembly of said glazing panel and glazing strips being of larger dimensions than said primary opening and, exclusive of said locking strips, smaller than said access opening,
  (j) the peripheral dimensions of said glazing assembly, including said locking strips, being larger than said access opening, and also larger than the opening defined by the base portions of said structural frame,
  (k) said locking strips being flexibly and resiliently related to the base portions of said glazing strips by reason of a reduced thickness, hinge-like connection thereto, whereby said locking strips are resiliently displaceable toward said base portions,
  (l) said lip-forming flanges being recessed for locking engagement with the backwardly extending free end of said locking strips upon insertion of said glazing assembly into said structural frame,
  (m) resilient sealing means interposed between the front flanges of said structural frame and the front peripheral surface portions of said glazing assembly to form a seal,
  (n) said sealing means being disposed about substantially the entire periphery of said structure and being sufficiently compressible to accommodate forward movement of the displaced locking strips past said lip-forming flanges,
  (o) said sealing strips being retained under substantial compression by said glazing assembly when said locking strips are engaged in said recesses.

2. An impact resistant window structure according to claim 1, further characterized by
  (a) said glazing assembly including locking strip means extending substantially continuously about the entire periphery of said assembly.

3. An impact resistant window structure according to claim 1, further characterized by
  (a) said glazing strips, along at least three sides of said glazing assembly, being formed with a line of weakness along the root area of said back flanges,
  (b) said back flanges being removable in tear-strip fashion from said glazing assembly to accommodate removal of said glazing assembly.

4. The impact resistant window structure according to claim 1, wherein (a) said glazing assembly has four rectilinear sides,
(b) said resilient locking strips extend peripherally along three sides of said glazing assembly, and
(c) wherein the glazing strip which extends along the fourth side of said glazing assembly has a rigid leg extending therefrom into hinging engagement with said structural frame.

5. The impact resistant window structure according to claim 1, wherein
(a) said glazing strips are made entirely of extruded aluminum.

6. The impact resistant window structure according to claim 1, wherein
(a) said glazing strips having front flanges spaced from the back flanges and extending over peripheral portions of the front surface of said glazing panel,
(b) said front flanges being disposed intermediate said glazing panel and the front flange of said structural frame,
(c) said sealing means being disposed in compression intermediate said respective front flanges.

7. An impact resistant window structure according to claim 1, further characterized by
(a) said glazing assembly including locking strip means extending along all principal sides of said assembly.

8. An impact resistant window structure according to claim 7, further characterized by
(a) said locking strip means including a relatively non-yieldable element extending along one side edge of said glazing assembly and cooperating with a lip-forming flange of said structural flange to form a hinge.

9. An impact resistant window structure according to claim 1, further characterized by
(a) said locking strips being of increased thickness toward the free edges thereof and of substantially reduced thickness at the juncture thereof with the base portions of said glazing strips.

10. An impact resistant window structure according to claim 9, further characterized by
(a) said locking strips being bendable primarily at said hinge, like connections during installation of said glazing assembly into said structural frame.

11. An impact resistant window structure according to claim 10, further characterized by
(a) said lip-forming flanges being rounded along the back-facing corner thereof to facilitate forward movement thereover of the resiliently displaced locking strips.

12. An impact resistant window structure according to claim 1, further characterized by
(a) said locking strips are generally straight in cross sectional configuration between said hinge-like connections and their free end portions, and
(b) said locking strips extend at an acute angle to an axis normal to the plane of said glazing panel.

13. An impact resistant window structure according to claim 12, further characterized by
(a) said acute angle being from about 30° to about 45°.

14. An impact resistant window structure according to claim 12, further characterized by
(a) said locking strips constantly urging said glazing strips inward toward said glazing panel.

15. The impact resistant window structure according to claim 12, wherein
(a) a resilient spline being inserted in the angular space between the base portions of said glazing strips and said locking strips.

* * * * *